United States Patent
LeTourneau et al.

(10) Patent No.: US 9,272,208 B1
(45) Date of Patent: Mar. 1, 2016

(54) METHODS AND SYSTEMS FOR GENERATING TAILORED GAME CHALLENGES

(75) Inventors: Tim LeTourneau, San Francisco, CA (US); Alexi Chialtas, San Francisco, CA (US); Joe Traverso, San Francisco, CA (US); Hao Chen, San Francisco, CA (US)

(73) Assignee: Zynga Inc., San Francisco, CA (US)

(*) Notice: Subject to any disclaimer, the term of this patent is extended or adjusted under 35 U.S.C. 154(b) by 395 days.

(21) Appl. No.: 13/604,552

(22) Filed: Sep. 5, 2012

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *A63F 13/40* | (2014.01) |
| *A63F 13/79* | (2014.01) |
| *A63F 13/63* | (2014.01) |
| *A63F 13/69* | (2014.01) |
| *A63F 13/335* | (2014.01) |
| *A63F 13/30* | (2014.01) |
| *A63F 13/60* | (2014.01) |

(52) U.S. Cl.
CPC .............. *A63F 13/10* (2013.01); *A63F 13/12* (2013.01); *A63F 13/335* (2014.09); *A63F 13/60* (2014.09); *A63F 13/63* (2014.09); *A63F 13/69* (2014.09); *A63F 13/79* (2014.09); *A63F 2300/575* (2013.01)

(58) Field of Classification Search
USPC ............................... 463/20, 23, 39, 40, 42, 25
See application file for complete search history.

(56) References Cited

U.S. PATENT DOCUMENTS

| | | | | |
|---|---|---|---|---|
| 8,550,920 | B1* | 10/2013 | Allen et al. ..................... | 463/42 |
| 9,101,834 | B2 | 8/2015 | LeTourneau et al. | |
| 2003/0114219 | A1* | 6/2003 | McClintic ....................... | 463/25 |
| 2006/0003841 | A1* | 1/2006 | Kobayashi et al. ............. | 463/42 |
| 2006/0121991 | A1* | 6/2006 | Borinik et al. .................. | 463/43 |
| 2009/0131152 | A1* | 5/2009 | Busse ............................. | 463/23 |
| 2009/0149246 | A1* | 6/2009 | Opaluch ........................ | 463/29 |
| 2014/0066176 | A1 | 3/2014 | Letourneau et al. | |

OTHER PUBLICATIONS

"U.S. Appl. No. 14/018,998, Non Final Office Action mailed Oct. 31, 2014", 8 pgs.
"U.S. Appl. No. 14/018,998, Notice of Allowance mailed Apr. 8, 2015", 8 pgs.
"U.S. Appl. No. 14/018,998, Response filed Jan. 30, 2015 to Non-Final Office Action mailed Oct. 31, 2014", 10 pgs.

* cited by examiner

*Primary Examiner* — Adetokunbo O Torimiro
(74) *Attorney, Agent, or Firm* — Schwegman Lundberg & Woessner, P.A.

(57) ABSTRACT

A system, computer-readable storage medium storing at least one program, and a computer-implemented method for generating tailored game challenges are presented. To begin, a method may first identify a first game object and a second game object operable within a game challenge. The method may calculate, based on game profile data associated with a player, a first selection factor associated with the first game object and a second selection factor associated with the second game object. A game object from the first game object and the second game object is then selected. The selection is based on the first selection factor and the second selection factor. The game challenge is then generated, wherein the game challenge with the selected game object for the user.

20 Claims, 13 Drawing Sheets

METHODS AND SYSTEMS FOR GENERATING TAILORED GAME CHALLENGES

TECHNICAL FIELD

The present embodiments relate to methods for executing games in a distributed environment and, more particularly, methods, systems, and computer programs for generating computer-generated game challenges.

BACKGROUND

Some conventional game systems host online games that utilize a quest mechanic to present one or more game challenges to a player. These conventional game systems generally use static quests. A "static quest," as used herein, may refer to a quest that is defined and released into a game system before the quest is assigned to a particular player. Often times the static quests are created by development engineers who manually draft many (e.g., tens or hundreds, or maybe even thousands or more) different quests or tasks. Commonly, such static quests are then assigned to a player according to a predefined sequence, similar to a movie script, or according to a random sequence.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Figure 1:
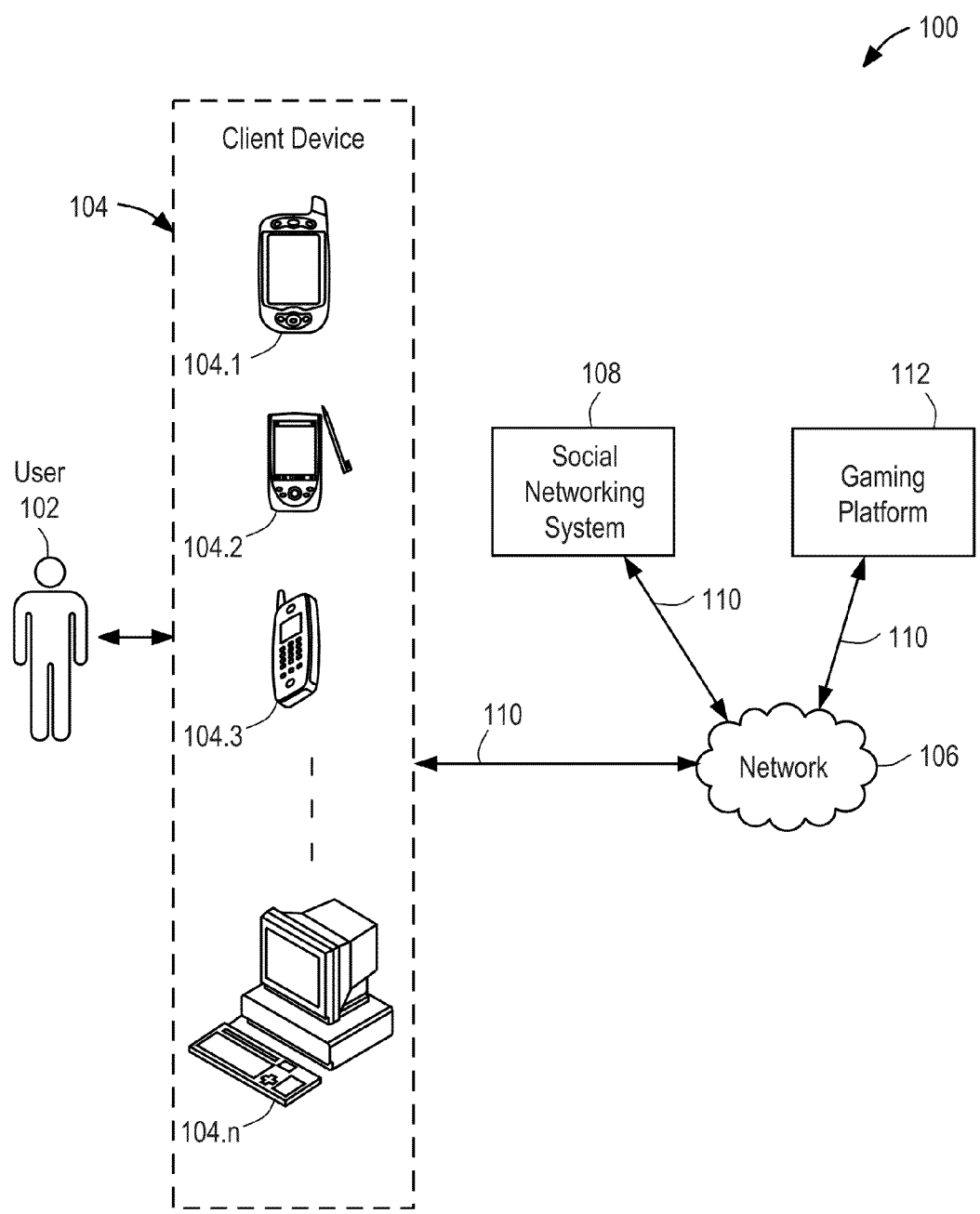
FIG. 1 illustrates an example of a gaming environment for implementing various example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, users of computer-implemented systems may access a gaming platform to interact with an online game. For example, through a gaming platform, as provided by Zynga, Inc., a user (e.g., a player) may access an online game that depicts a virtual game environment, such as a farm, with a multitude of game objects located therein. By way of example and not limitation, crops, avatars, virtual animals, buildings, and the like are all examples of game objects that may be in the virtual game environment.

In some embodiments, the gaming platform may provide a number of game challenges to a player by offering a quest mechanism that provides tailored game challenges based on game profile data associated with the player. Examples of game profile data include data relating to game objects in the game board of the player, game objects in the inventory of the player, response rate of the game network associated with the player, past game challenges completed by the player, a number of active friends in a social game network, a response rate associated with the social game network, a number of expected responses from the game network, and so forth.

For example, to generate a tailored game challenge, the gaming platform may identify a first game object and a second game object. In some cases, the first game object and the second game object may be game objects available in the game. For example, in a virtual farming game that allows players to grow wheat crops and apple trees, the first game object may be Wheat, and the second game object may be Apple.

After identifying the first game object and the second game object, the gaming platform may then calculate a first selection factor associated with the first game object and a second selection factor associated with the second game object. As used herein, the term "selection factor" may refer to any suitable logic or data that affects the relative likelihood that one game object may be selected over another game object. A selection factor may be represented in many different forms. Percentages, weights, ranks, buckets, and the like are all examples of selection factors that may be used by example embodiments.

In example embodiments, the first selection factor and the second selection factor are calculated based at least on game profile data associated with a player. For example, where a player has recently unlocked an Apple Tree game object, the selection factor associated with Apples may be weighted more heavily than other game objects that were unlocked earlier in the game. The term "unlocked," as used herein, may refer to a game event that makes a game object available for use by a player. In some embodiments, game objects are unlocked when a player obtains a give experience level associated with the game objects. When a game object is not available, that game object may be referred to as "locked."

After calculating the first selection factor and the second selection factor, the gaming platform may then select, based on the first selection factor and the second selection factor, a game object from the first game object and the second game object. The gaming platform may then generate the game challenge involving the selected game object.

It is to be appreciated that a gaming platform providing tailored game challenges may find many practical applications. For example, tailored game challenges may challenge the player in a way that targets a player's playing habits or behaviors. Further, such tailored game challenges may provide challenges that are unique and fresh, rather than scripted and merely repetitive.

These and other example embodiments of the invention are described, by way of example, in further detail below.

Example System

FIG. 1 illustrates an example of a gaming environment 100 for implementing various example embodiments. In some embodiments, the gaming environment 100 comprises a user 102, a client device 104, a network 106, a social networking system 108, and a gaming platform 112. The components of the gaming environment 100 may be connected directly or over a network 106, which may be any suitable network, via a suitable network connection 110. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, any other type of network, or a combination of two or more such networks.

Although FIG. 1 illustrates a particular example of the arrangement of the user 102, the client device 104, the social networking system 108, the gaming platform 112, and the network 106, any suitable arrangement or configuration of the user 102, the client device 104, the social networking system 108, the gaming platform 112, and the network 106 may be contemplated.

The client device 104 may be any suitable computing device (e.g., devices 104.1-104.$n$), such as a smart phone 104.1, a personal digital assistant (PDA) 104.2, a mobile phone 104.3, a personal computer 104.$n$, a laptop, a computing tablet, or any other device suitable for playing a virtual game. The client device 104 may access the social networking system 108 or the gaming platform 112 directly, via the network 106, or via a third-party system. For example, the client device 104 may access the gaming platform 112 via the social networking system 108.

The social networking system 108 may include a network-addressable computing system that can host one or more social graphs (see for example FIG. 2), and may be accessed by the other components of gaming environment 100 either directly or via the network 106. The social networking system 108 may generate, store, receive, and transmit social networking data.

Figure 2:
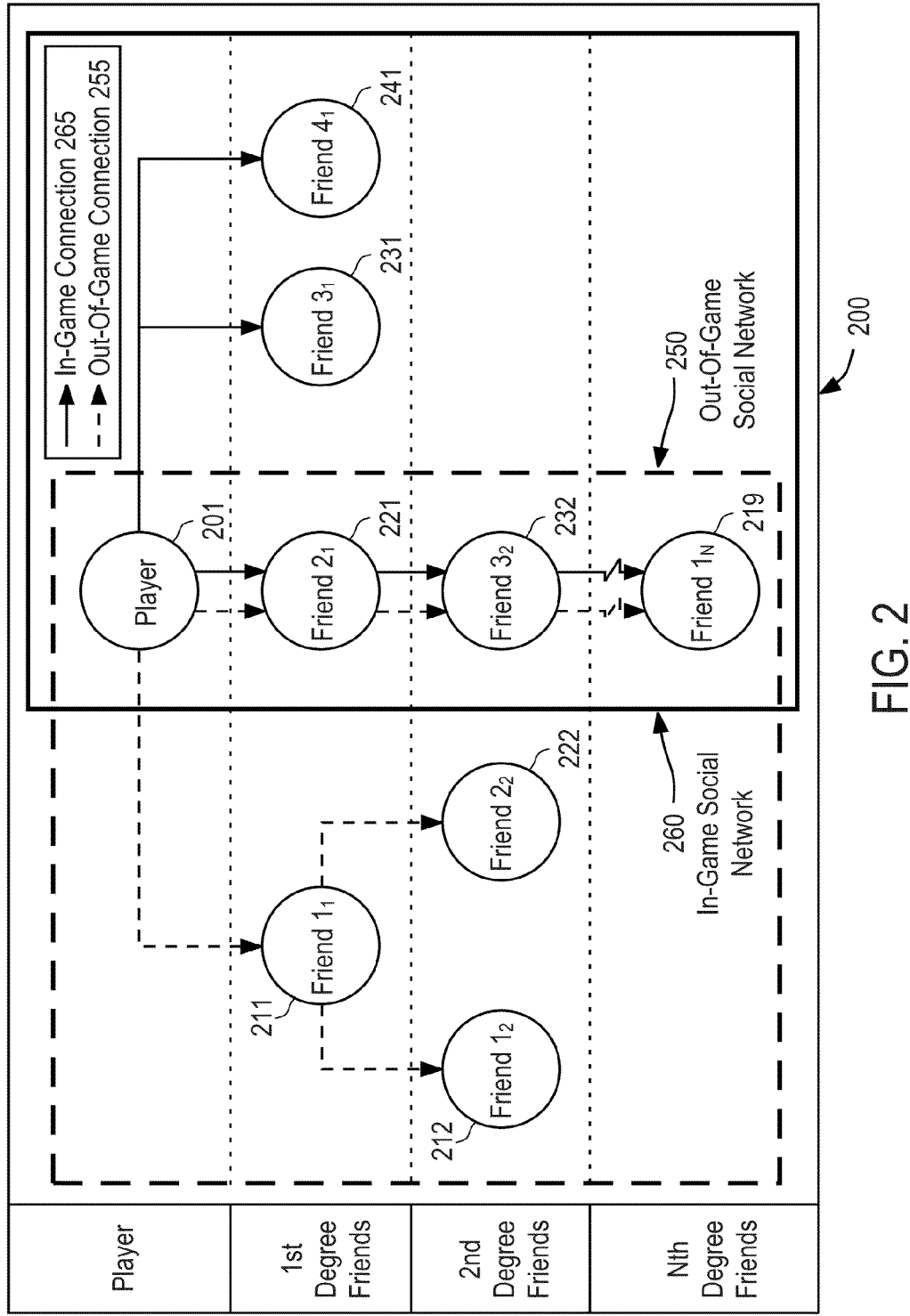
FIG. 2 shows an example of a social network within a social graph, according to some embodiments.

FIG. 2 shows an example of a social network within a social graph 200. The social graph 200 is shown by way of example to include an out-of-game social network 250 and an in-game social network 260. Moreover, the in-game social network 260 may include one or more users that are friends with Player 201 (e.g., Friend $3_1$ 231), and may include one or more other users that are not friends with Player 201. The social graph 200 may correspond to the various users associated with the virtual game. FIG. 2 is described in greater detail below. The social graph 200 may track various social metrics. A social metric may include data characterizing the response rate of a request sent by the Player 201 to their friends (e.g., Friend $3_1$ 231). In some embodiments the social metric may include a number of friends within the social graph 200. In some embodiments, the social metrics may correspond to particular communication channels used by a social network. A communication channel may be the messaging system of the social network (e.g., an inbox), a news feed, a post, a tweet, an email, or the like.

With reference back to FIG. 1, the gaming platform 112 may include a network-addressable computing system (or systems) that can host one or more virtual games (for example, online games). The gaming platform 112 may generate, store, receive, and transmit game-related data, such as, for example, game account data, game input, game state data, and game displays. The gaming platform 112 may be accessed by the other components of the gaming environment 100 either directly or via the network 106. The user 102 may use the client device 104 to access, send data to, and receive data from the social networking system 108 and/or the gaming platform 112.

Figure 3:
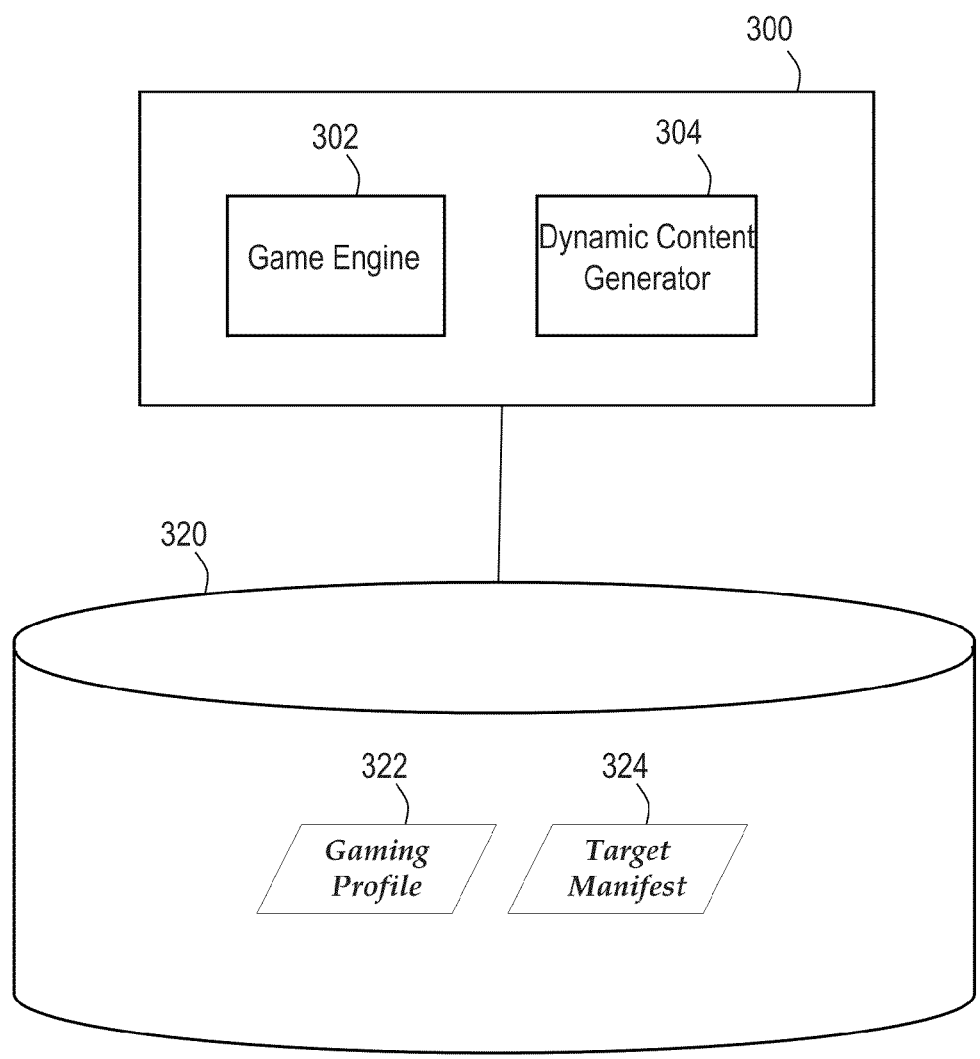
FIG. 3 is a block diagram depicting various modules, in accordance with example embodiments, that may be included in a processing system.

FIG. 3 is a block diagram depicting various modules, in accordance with example embodiments, that may be included in a processing system 300. It should be appreciated that the processing system 300 may be deployed in the form of, for example, a server computer, a client computer, a personal computer, a laptop computer, a mobile phone, a PDA, and other processing systems. For example, in one embodiment, the processing system 300 may be embodied as the gaming platform 112 of the gaming environment 100 depicted in FIG. 1. In an alternate embodiment, the processing system 300 may be embodied as the client device 104 of the gaming environment 100. As a further example, the modules of the processing system 300 may be distributed across both the gaming platform 112 and the client device 104 of the gaming environment 100 depicted in FIG. 1. Referring to FIG. 3, in various embodiments, the processing system 300 may be used to implement computer programs, logic, applications, methods, processes, or software to generate game quests tailored to the user.

As FIG. 3 shows, the processing system 300 may include a game engine 302 and a dynamic content generator 304. The game engine 302, according to various embodiments, may be configured to perform operations related to generating, storing, receiving, and transmitting game-related data, such as, for example, game account data, game input, game state data, and game displays. In example embodiments, the game engine 302 may perform the operations related to generating, storing, receiving, and transmitting game-related data responsive to receiving directed content data from the dynamic content generator 304.

The dynamic content generator 304 may be configured to generate content such as game challenges that are tailored to a given player. For example, consistent with embodiments described in this disclosure, the dynamic content generator 304 may select one or more game objects to be part of the game quest based on game profile data associated with the player. The operations involved in generating tailored game quests are described in greater detail below with reference to FIGS. 5-10.

The game engine 302 and the dynamic content generator 304 may be communicatively coupled to a gaming database 320. The gaming database 320 may store a gaming profile 322 associated with the user 102 and a target manifest 324. In some embodiments, the gaming profile 322 may include gaming data related to the user 102, such as data relating to game objects in the game board of the player, game objects in the inventory of the player, response rate of the game network associated with the player, past game challenges completed by the player, a number of active friends in a social game network, a response rate associated with the social game network, a number of expected responses from the game network, and the like. The target manifest 324 may include data that identifies game objects used in a game and, in some embodiments, relationships between game objects. The target manifest 324 is described in greater detail below with reference to FIG. 6.

It should be appreciated that in example embodiments, the processing system 300 may include fewer, more, or different modules apart from those shown in FIG. 3. For example, in an alternate embodiment, the game engine 302 and the dynamic content generator 304 may be combined into a single module. In another embodiment, the game engine 302 can be separate from, and executed or processed in parallel with, the dynamic content generator 304.

Example Game Quest

Figure 4:
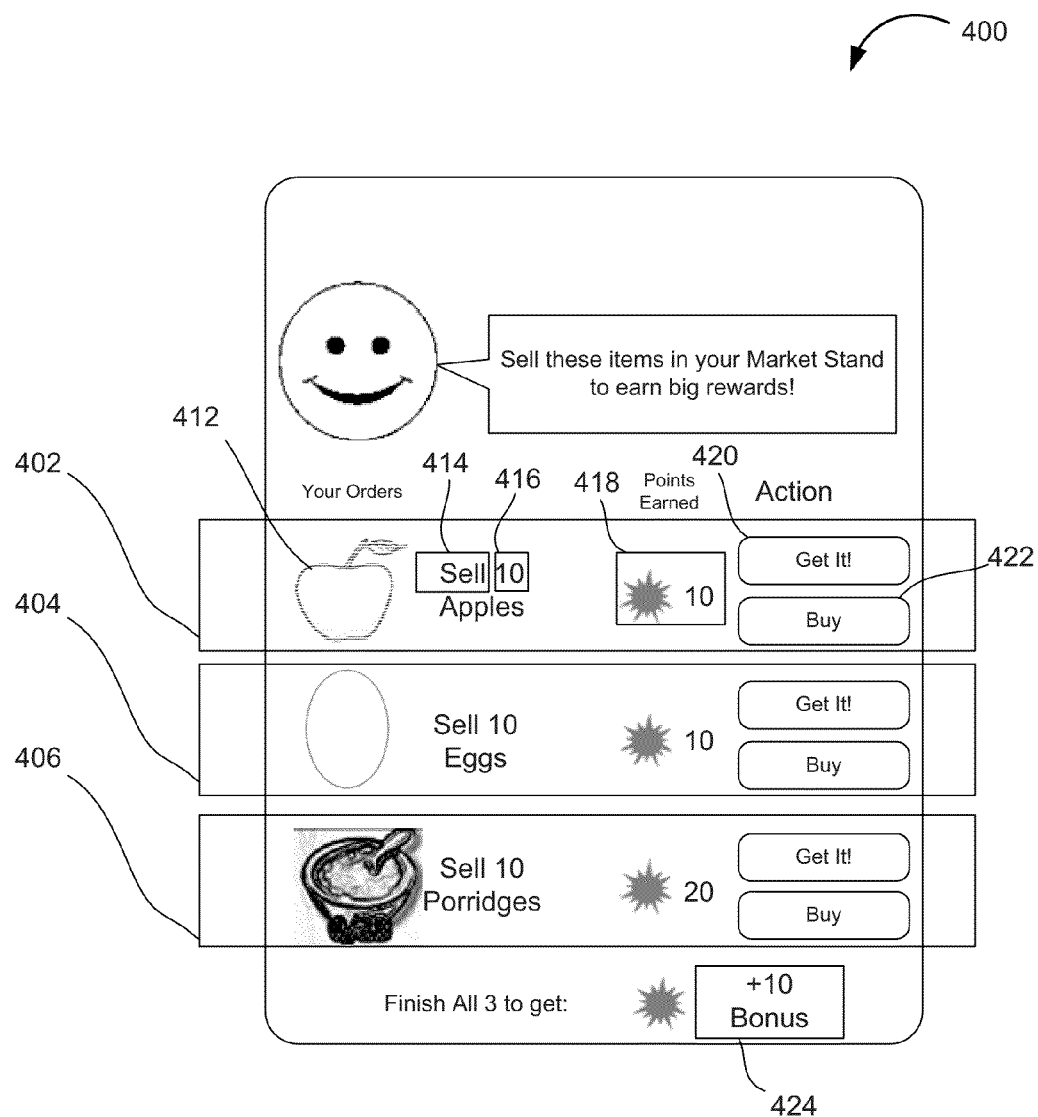
FIG. 4 is a user interface diagram illustrating an example game quest, as may be generated and displayed by example embodiments.

Before discussing the methods and operations associated with generating tailored game quests, FIG. 4 is a user interface diagram illustrating an example game quest 400, as may be generated and displayed by example embodiments. FIG. 4 shows that the game quest 400 may specify one or more game challenges 402, 404, 406 that a player is to complete to finish the game quest 400.

Each of the game challenges may specify a game object (e.g., the game object 412, which represents apples), a game action (e.g., the game action 414, which specifies the sell game action) that is to be performed with respect to the game object, and a challenge difficulty (e.g., the challenge difficulty 416) that specifies a number of times (e.g., 10) the game action is to be performed with respect to the game action before the game engine 302 considers the game challenge complete. Thus, with respect to the game challenge 402, the player is challenged to sell 10 apples in the game hosted on the gaming platform 112.

Further, FIG. 4 shows that each game challenge may further include a game reward (e.g., game reward 418) that the game engine 302 provides to the player based on successfully completing the game challenge. The game reward 418 may be experience points that are used to advance an experience level. In some cases, game play may be gated based on a player's experience level. For example, certain game objects may only become available or otherwise unlocked when a player achieves a given experience level.

Additionally or alternatively, a game challenge may include a shortcut user interface element 420 (labeled "Get It!") that, when activated, causes the game engine 302 to display a portion of the game board capable of supplying the game object (e.g., a location where apple trees are planted). Still further, additionally or alternatively, a game challenge may include a skip challenge user interface element 422 (labeled "Buy") that causes the game engine 302 to mark the game challenge as complete in exchange for a cost (e.g., virtual currency).

Once a player has completed all the game challenges of a game quest, the game engine may reward the player with a quest reward, such as a virtual currency, experience points, a game object, or any other game asset, as represented by quest reward 424.

It is to be appreciated the game quest 400 shown in FIG. 4 is merely provided for the purpose of illustrating one example of a simple game quest. Other game quests may include more, less, or different data, such as different game objects, game actions, challenge difficulties, and still be considered consistent with other example embodiments contemplated by this disclosure.

Example Methods

Figure 5:
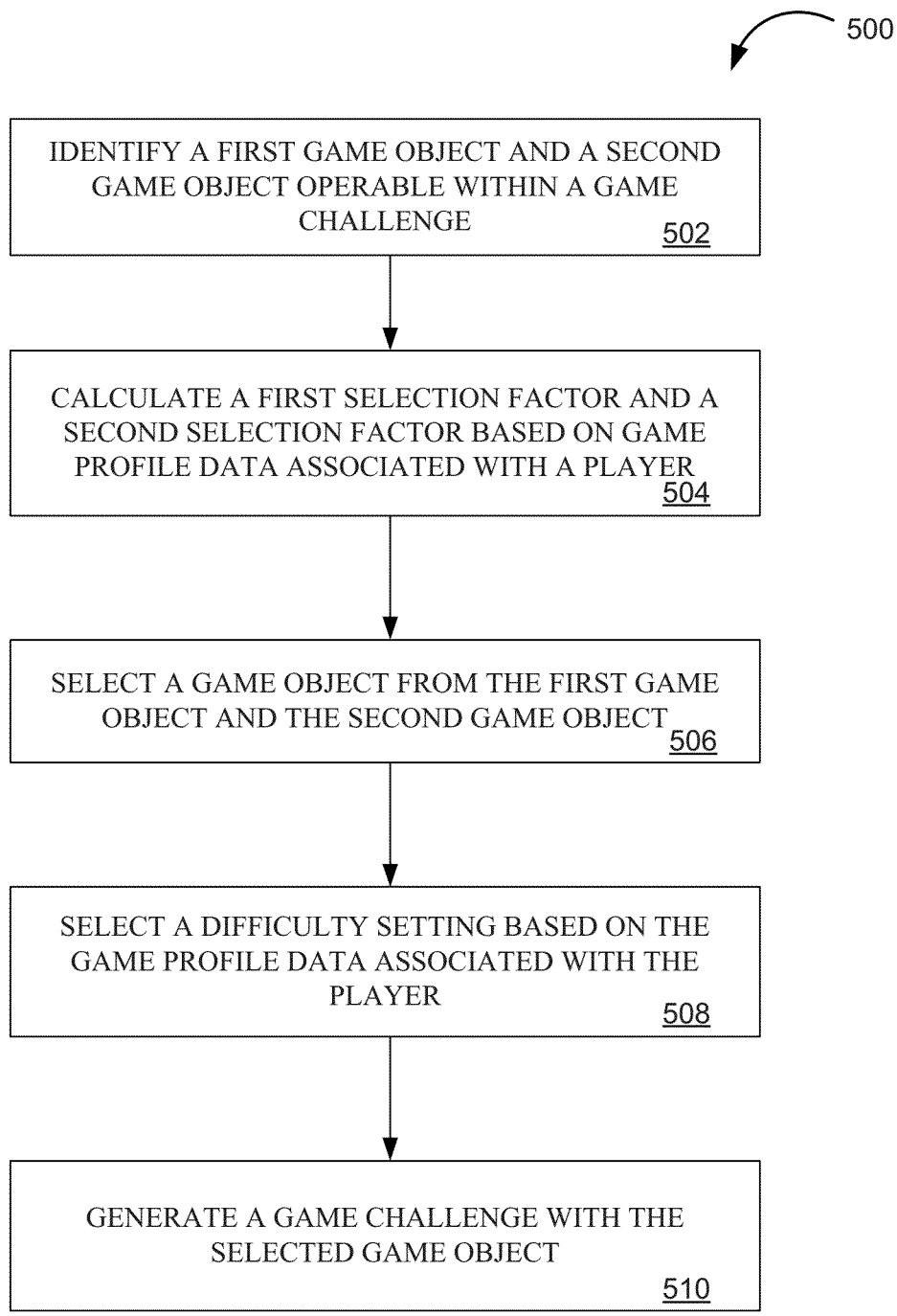
FIG. 5 is a flow chart illustrating a method of generating tailored game challenges, according to an example embodiment.

FIG. 5 is a flow chart illustrating a method 500 of generating tailored game challenges, according to an example embodiment. In an example embodiment, the method 500 may be implemented by the components and modules shown in FIGS. 1 and 3, and, as such, portions of FIG. 5 are described with reference thereto.

As depicted in FIG. 5, the method 500 may begin at operation 502 when the method 500 identifies a first game object and a second game object as operable in a game challenge of an online game. By way of example and not limitation, a game challenge may specify a game action (e.g., buy, sell, build, craft, or request) relative to a game object (e.g., a virtual crop, such as an apple). Accordingly, the identification of the first game object and the second game object performed by operation 502 may then be thought of as identifying a search space of possible game objects that may be used in a game challenge. In some embodiments, the first game object and the second game object are identified by the dynamic content generator 304 by accessing the target manifest 324 of FIG. 3. As described above, the target manifest 324, according to some example embodiments, may be any suitable data that identifies game objects used in a game. The target manifest 324 is described below, with reference to FIG. 6.

At operation 504, the method 500 may calculate a first selection factor and a second selection factor based on a game profile associated with the player. As previously discussed, the term selection factor may refer to logic or data that affects the relative likelihood that one game object may be selected over another game object. According to some example embodiments, operation 504 may include adjusting one of the selection factors to bias the selection towards or away from a particular game object. For example, consistent with some example embodiments described herein, operation 504 may calculate a selection factor to bias selections of game objects that are personalized to a player's tenure, interests, and play patterns. Particular methods for calculating selection factors are described with reference to FIGS. 6-10.

At operation 506, the method 500 may select a game object from the first game object and the second game object. The selection of the game object, according to some example embodiments, may be based on the selection factors associated with the respective game objects previously calculated according to operation 504.

At operation 508, the method 500 may select a difficulty associated with the selected game object. As is explained with respect to FIG. 11, the selected difficulty may be based on an ability to complete the challenge, which, in turn, may be based on the game profile associated with a player. Merely as an example, a difficulty may be represented as a number of times a particular challenge needs to be completed before the game engine 302 will determine that the game challenge is complete. Accordingly, where the challenge is to request a select game object (e.g., an Apple) from a friend, the selected difficulty may be determined based on a function of a degree of activity within the game network of the player. Thus, where the player is associated with a game network with a relatively high response rate, then operation 508 may request the player to receive "5" apples from friends but, where the player is associated with a game network with a relatively low response rate, then operation 508 may require the player to receive "3" apples from friends.

At operation 510, the method 500 may generate a game challenge involving the selected game object. In example embodiments, the method 500 may generate the game challenge by processing a game challenge template to incorporate the selected game object. Such a game challenge template may provide a standardized format to insert the selected game object and difficulty.

It is to be appreciated that, according to some example embodiments, the game challenge generated at operation 510 is personalized or otherwise tailored to the player. Such may be the case because the selection of the game object used in the game challenge is based on or at least biased in part by selection factors calculated from game profile data associated with the player. For example, the gaming platform 112 may be more likely to generate a game challenge involving Apples when the game profile data associated with the player indicates that the player has the capability to produce apples. Such may be the case when, for example, the game profile data associated with the player indicates that the player has Apple Trees in their farm.

Figure 6:
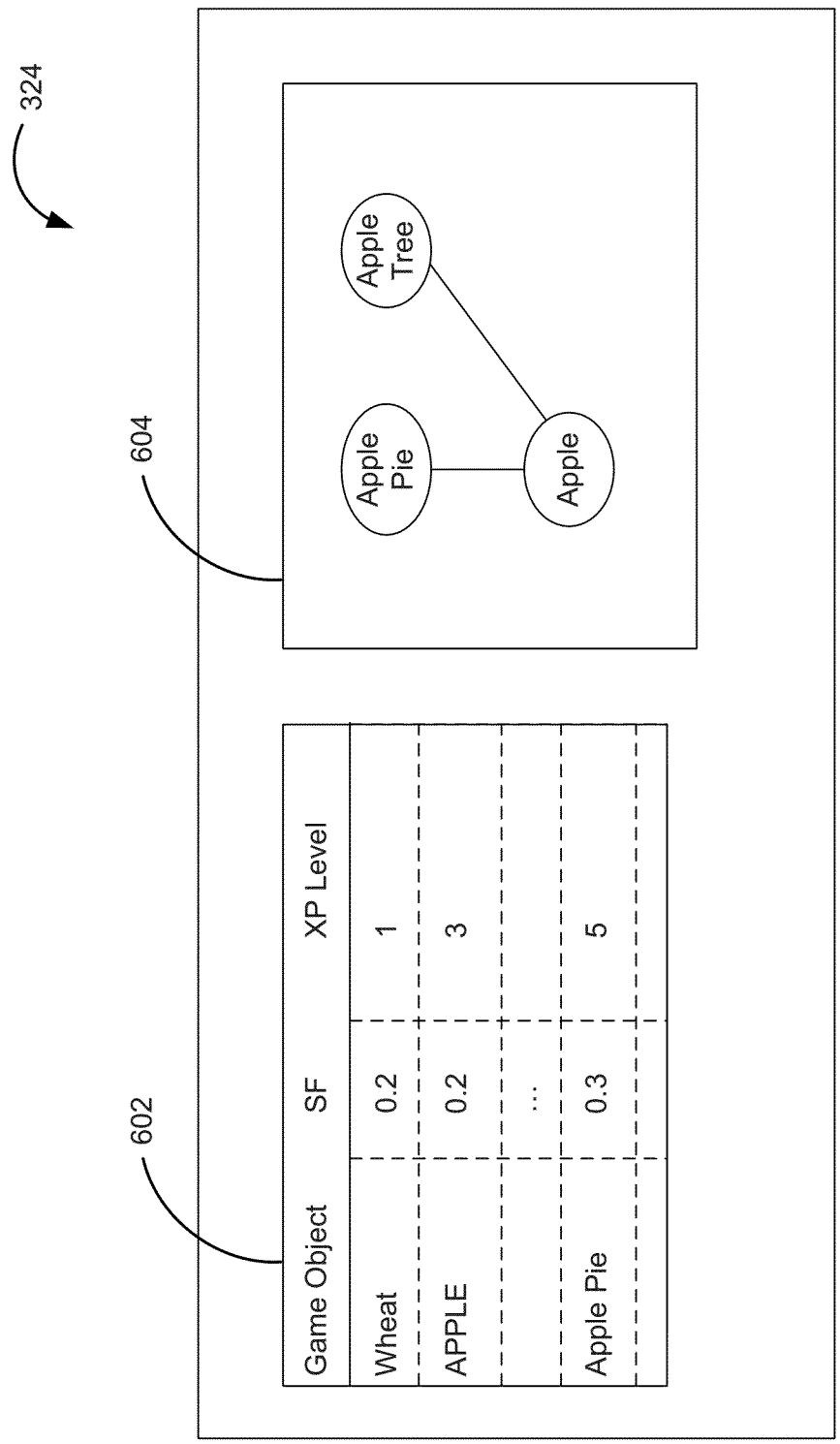
FIG. 6 is a data diagram showing the target manifest of FIG. 3 in greater detail, according to an example embodiment.

FIG. 6 is a data diagram showing the target manifest 324 of FIG. 3 in greater detail, according to an example embodiment. The target manifest 324 may include data and/or logic usable in selecting one game object over another, as may be used in generating a game challenge. In some embodiments, the target manifest 324 may be a multidimensional array, graph, linked list, or any other suitable data structure.

FIG. 6 shows that the target manifest 324 may include game object data 602 and a relationship graph 604. The game object data 602 may include data or logic (e.g., a table, array, linked list, tree, or any other suitable data structure) that associates a selection factor and experience level with a game object. As described above, a selection factor may be data that influences the selection of a game object or another game object. The experience level of a game object may refer to data that specifies at which experience level a game object becomes available to a player. When a game object is available based on the experience level of the player, the game object may be referred to an unlocked game object; otherwise, the game object may be referred to a locked game object.

FIG. 6 shows that the game object data 602 associates the game object Wheat with a selection factor of 0.2 and an experience level of 1. FIG. 6 also shows that the game object data 602 associates the game object Apple with a selection factor of 0.2 and an experience level of 3. Still further, FIG. 6 shows that the game object data 602 associates the game object Apple Pie with a selection factor of 0.3 and an experience level of 5. Accordingly, based on the selection factors of the Wheat, Apple, and Apple Pie game objects. Apple Pie is the most likely to be selected because Apple Pie has the highest selection factor (e.g., 0.3>0.2).

The relationship graph 604 may be data or logic that specifies relationships between different types of game objects. For example, the relationship graph may specify a composite relationship between Apple and Apple Pie. A composite relationship may indicate that one game object (e.g., Apple Pie) is composed of another game object (e.g., Apples). Composite relationships may be useful in defining recipes for game objects. Additionally or alternatively, the relationship graph 604 may specify a production relationship. A production relationship may specify that one game object (e.g., Apple Tree) produces another type of game object (e.g., Apples). Production relationships may be useful in determining whether a player has the ability (e.g., owns apple trees on the game board) to fulfill a requirement (e.g., grow apples).

The target manifest 324 is discussed in more detail with respect to modifying selection factors, according to example embodiments.

Figure 7:
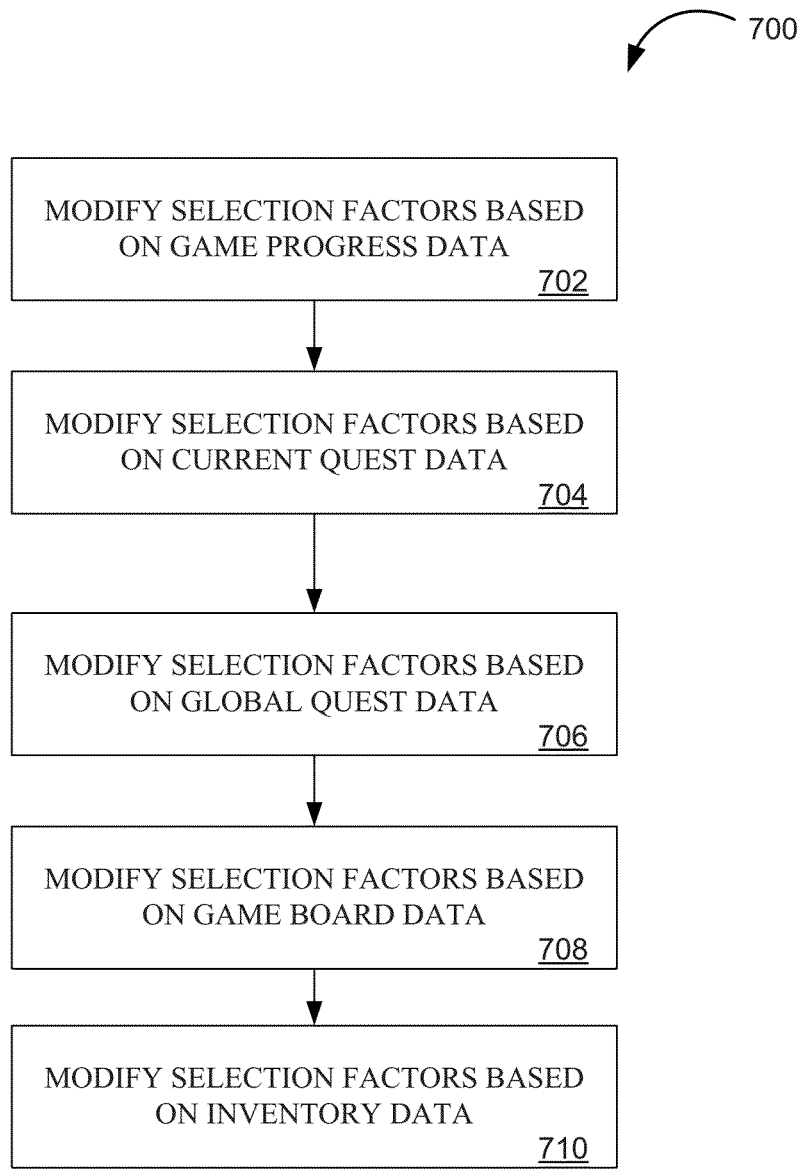
FIG. 7 is a flow chart diagram illustrating a method of modifying selection factors, according to an example embodiment.

FIG. 7 is a flow chart diagram illustrating a method 700 of modifying selection factors, according to an example embodiment. The factors described with respect to FIG. 7 may be used in the context of operation 504 of FIG. 5.

At operation 702, the dynamic content generator 304 may modify a selection factor based on game progress data in the gaming profile 322. In some embodiments, operation 702 may involve modifying the selection factors of the game objects that are locked to the user (e.g., unavailable based on the experience level of the player) and are not selectable for the game challenge. In some other embodiments, operation 702 may involve adjusting one or more selection factors so that the game objects recently unlocked are more likely to be selected than game objects unlocked earlier in the game. Operation 702 is described in greater detail with reference to FIG. 8.

At operation 704, the dynamic content generator 304 may modify a selection factor based on quest requirement data. For example, operation 704 may operate to verify that game challenges in the same game quest do not include the same game objects. Additionally or alternatively, operation 704 may involve modifying selection factors so that game objects do not repeat in game challenges of subsequent game quests (e.g., a game challenge in the last game quest does not involve the same game object as a game challenge in next game quest). Operation 704 is described in greater detail below, with reference to FIG. 9.

At operation 706, the dynamic content generator 304 may modify a selection factor based on whether the game quest is to include a viral game object. For example, the dynamic content generator 304 of FIG. 3 may make a probabilistic determination (e.g., a conceptual roll of a dice) on whether the current game quest or game challenge is to be viral or not. If the game challenge is to be viral, the dynamic content generator 304 checks to see which game object is the currently active viral game object and selects the viral game object. In some embodiments, the probability that a game challenge includes a viral item (e.g., Viral 1 appears on Day 1, Viral 2 appears on Day 2, Viral 3 appears on Day 3, . . . , Viral X appears on Day N, and the loop starts over) can be tuned. The dynamic content generator 304 may select a single viral game object for all viral quests generated within a determinable time period, such as hour, day, week, month, and so forth.

At operation 708, the dynamic content generator 304 may modify a selection factor based on user board data in the game profile 322. For example, selection factors associated with a game object that can be produced based on the game board of the player may be modified so that that game object has a higher probability to appear in a game challenge than game objects that are unable to be produced based on the game board of the player. For example, if the game board of the player includes an apple tree game object, the selection factor associated with apples may be adjusted so that apples are more likely to appear in the game challenge. In some embodiments, the dynamic content generator 304 may access the relationship graph 604 (see FIG. 6) of the target manifest 324 to determine whether a game object can be produced. For example, to determine whether a player's game board is able to produce an Apple game object, the dynamic content generator 304 may determine whether the game board includes any game object that is associated with Apples via a produces relationship. Additionally or alternatively, the selection factors associated with game objects that are composed of other game objects (e.g., Apple Pies are composed of Apples), may be similarly modified based on the player's game board's ability to produce the constituent game objects. As used herein, a "constituent game object" may refer to a game object that is a subpart or ingredient of another game object. Again, in some embodiments, the dynamic content generator 304 may access the relationship graph 604 (see FIG. 6) of the target manifest 324 to determine whether a game object can be produced based on being able to produce constituent game objects.

At operation 710, the dynamic content generator 304 may modify a selection factor based on inventory data of the gaming profile 322 associated with the player. For example, selection factors associated with game objects that a player has stored in his or her inventory may be modified to have a higher probability to appear in a game challenge. In some embodiments, the increase in the selection factor is only for game objects that are X % of the inventory capacity for that game objects or greater. In this case, X may be a configurable parameter for the game. In other embodiments, operation 710 may not increase the selection factor for game objects that have already been increased. For example, if the player has apples in their inventory, operation 710 may not increase a selection factor if operation 708 increased the selection factor for apples based on the player having an apple tree on their game board.

Selecting a Game Object

Some of the operations of the method 700 relating to selecting a game object are now described in greater detail.

Figure 8:
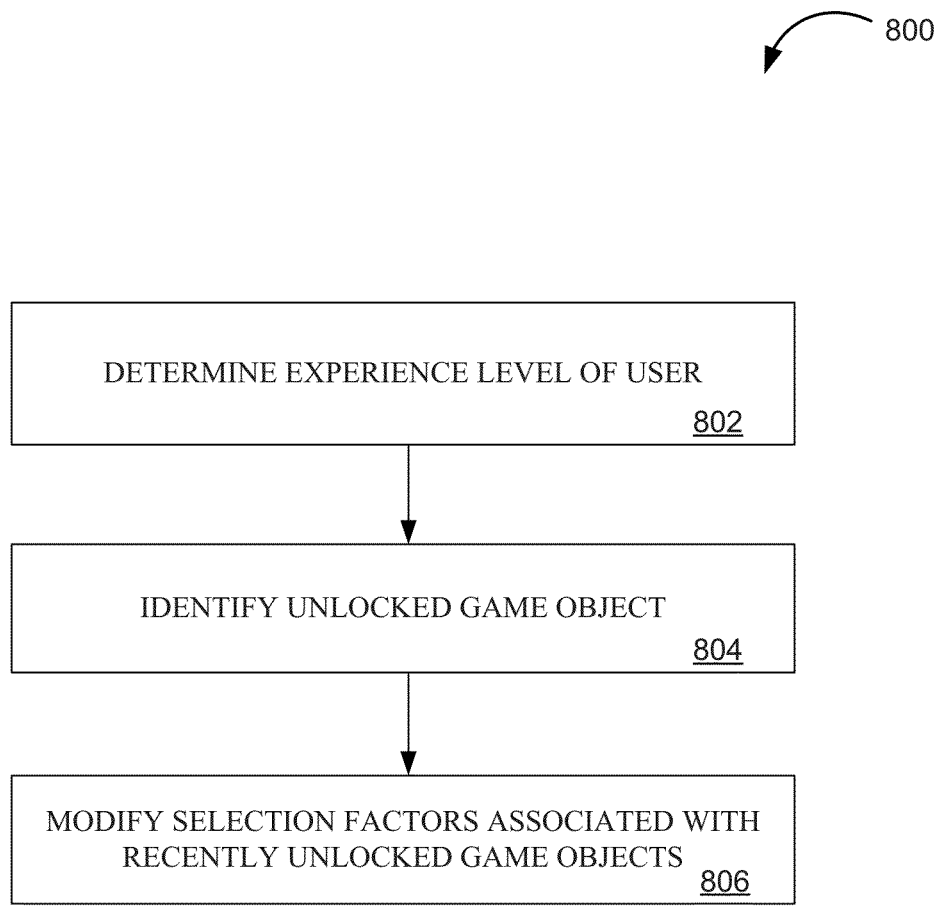
FIG. 8 is a flow chart diagram illustrating a method for modifying selection factors based on game progress data of the game profile, according to an example embodiment.

With regard to operation 702 of FIG. 7, FIG. 8 is a flow chart diagram illustrating a method 800 for modifying selection factors based on game progress data of the game profile. At operation 802, the dynamic content generator 304 may determine the current experience level of the user 102. Then, at operation 804, the dynamic content generator 304 may identify game objects that are unlocked at the experience level associated with the player. In some example embodiments, identifying the unlocked game objects may involve accessing the target manifest 324 of FIG. 3 and then assigning game objects associated with an experience level higher than the current experience level of the player (locked game objects) with a selection factor value that indicates that those locked game objects cannot be selected for the task being generated. Assigning locked game objects with a 0.0 weight, 0% likelihood, or removing the locked game objects from the possible set of game objects are examples of how the method 800 can assign the locked game objects with a selection factor value that indicates that they are cannot be selectable.

At operation 806, the dynamic content generator 304 may modify the selection factors to weight recently unlocked game objects more heavily than less recently unlocked items. By way of example and not limitation, with momentary reference to FIG. 6, Apples may be assigned a higher selection factor value than the Wheat based on the Apples being associated with a higher experience level. In some embodiments, unlocked game objects within a determinable number of experience levels (e.g., 1, 2, 3, 4, and so forth), may be modified to have higher selection factor values than those unlocked game objects outside of the determinable number of experience levels. In some embodiments, where the game objects within the most recent experience levels represent an X % chance of being selected in a task of a quest, the remaining game objects may be assigned selection factor values that represent the remaining (1-X) probability, spread across these other unlocked items. In this way, example embodiments may provide that all unlocked items have some probability to appear in a game challenge.

Figure 9:
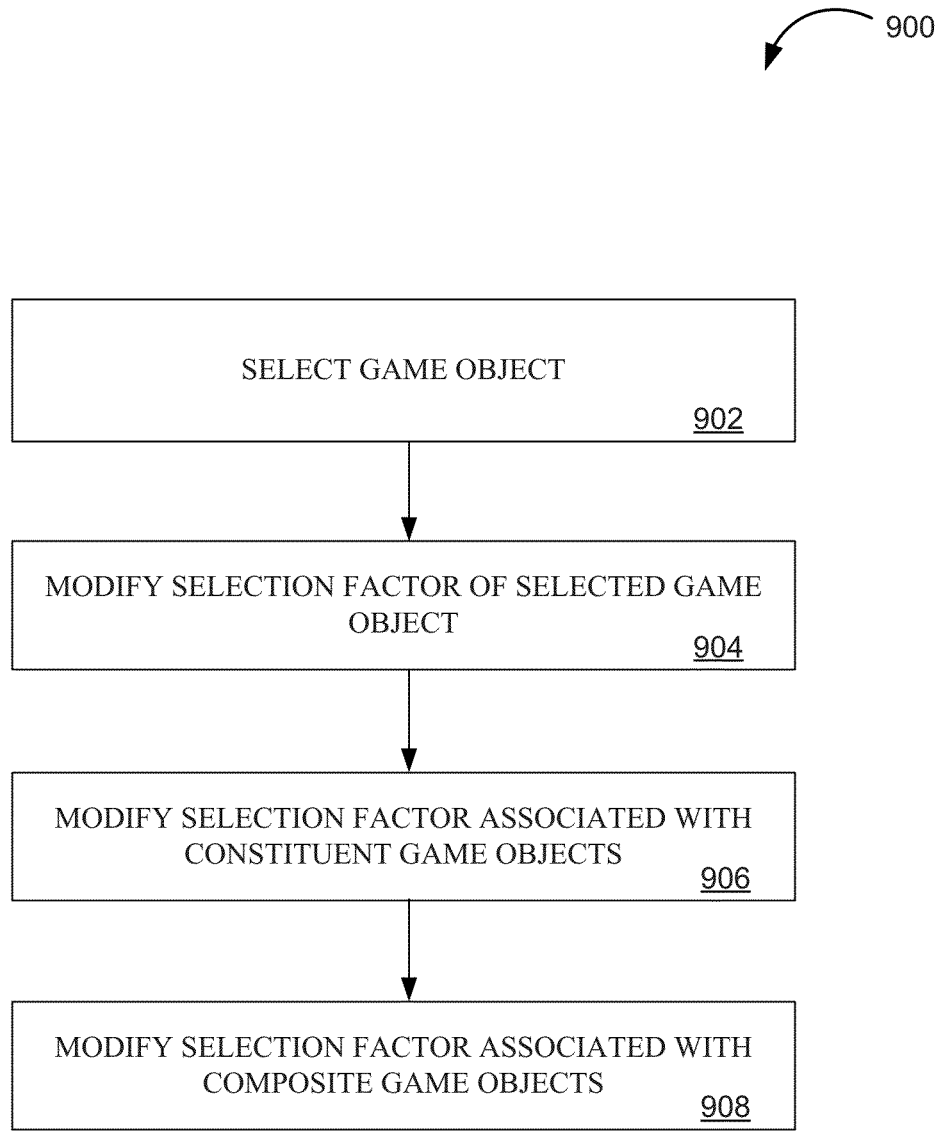
FIG. 9 is a flow chart diagram illustrating an example of a method of limiting the number of times a game object can be selected in the game challenges of a game quest, according to an example embodiment.

FIG. 9 is a flow chart diagram illustrating an example of a method 900 of limiting the number of times a game object can be selected in the game challenges of a game quest, according to an example embodiment. In some embodiments, the method 900 may be used perform the operation 704 of FIG. 7. As shown in FIG. 9, the method 900 may begin at operation 902 by selecting a game object for a game challenge in a game quest. By way of example and not limitation, the game object selected at operation 902 may be Apple Pie. At operation 904, responsive to the selecting the game object, the method 900 may then modify the selection factor associated with the selected game object. For example, the method 900 may assign the selection factor associated with Apple Pie to 0. In this way, operation 904 may prevent Apple Pie from being selected for subsequent game challenges in the game quest.

At operation 906, the method 900 may then modify the selection factors associated with constituent game objects associated with the selected game object. As described above, a constituent game object may refer to a game object that is a subpart or component of another game object. For example, continuing with the above example where Apple Pie is selected at operation 902, Apple Pie may be comprised of one or more constituent game objects, such as Apples, Sugar, Butter, Dough, and the like. It is to be appreciated that in some example embodiments, each of the constituent game objects may further be comprised of additional constituent game objects. Operation 906 may then modify the selection factors of the constituent game objects, and constituent game objects of the constituent game objects, and so forth.

At operation 908, the method 900 may modify selection factors associated with composite game objects associated with the selected game object. For example, suppose that Apple was selected rather than Apple Pie, as was previously discussed above in a prior example. In such a case, because Apple Pie is a composite game object that includes Apple, operation 908 may then update the selection factor associated with Apple Pie in such a way to bias the selection away from Apple Pie. Using Apple as an example, operation 908 may further update the selection factor associated with Apple Juice, as Apple Juice is also a composite game object that includes Apple.

It is to be appreciated that in some embodiments the method 900 may be iterative or otherwise recursive. For example, the constituent game objects and composite game objects having their associated selection factors modified according to operations 906 and 908 may then be used as the selected game object, and operations 906 and 908 are performed with respect to those newly selected game objects.

Although the method 900 described above is described in the context of biasing selections of certain game objects for a game challenge in a current quest, it is to be appreciated that in some example embodiments, method 900 may be performed in the context of biasing selections of certain game objects for game challenges in a future quest. In this way, the method 900 may be used to satisfy a quest generating rule specifying that a newly generated quest cannot contain any of the game objects that were included in the previous quest.

Figure 10:
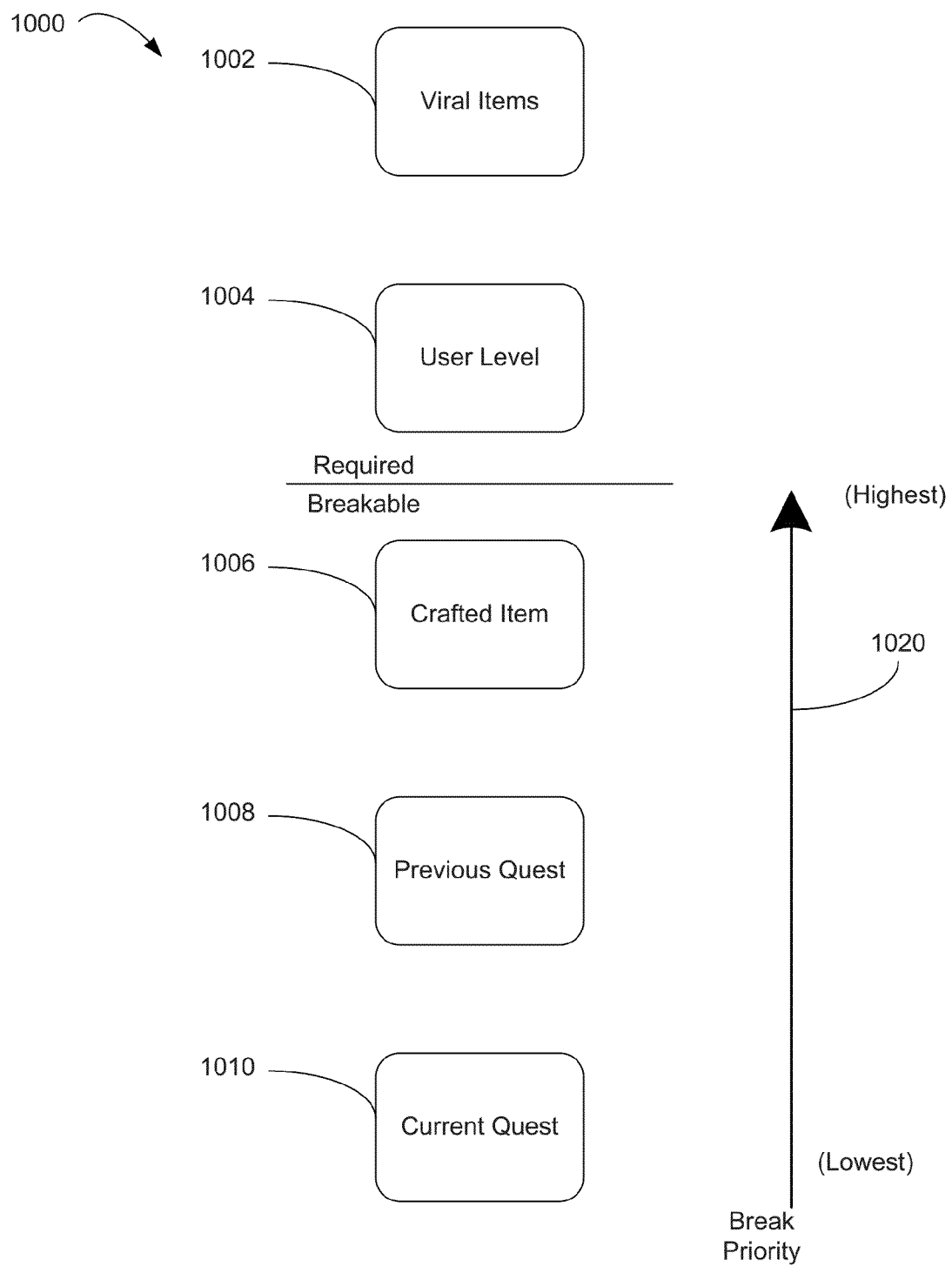
FIG. 10 is a diagram illustrating an example stack ranking of rules used to generate tailored game challenges, according to an example embodiment.

In some cases, a game object may not be selectable if the method 500 removes all possible game objects. FIG. 10 is a diagram illustrating an example stack ranking 1000 of rules used to generate tailored game challenges, according to an example embodiment. The stack ranking 1000 may be used to break rules in order to allow the dynamic content generator 304 to select game objects that are otherwise unselectable. The order in which a rule is broken may be determined according to a breaking priority 1020. By way of example, FIG. 10 illustrates that the stack ranking rules 1000 may enforce rules based on a viral game challenge rule 1002, a progress level rule 1004, a crafted game object rule 1006, a previous quest rule 1008, and a current quest rule 1010.

The viral game challenge rule 1002 may be a rule that specifies a degree of viral activity used by a game. Accordingly, the dynamic content generator 304 may use the viral game challenge rule 1002 to determine whether a game challenge or game quest conforms with the specified degree of viral activity. The degree of viral activity may be specified according to frequency of game quest (e.g., every X game quests), game challenge (e.g., every X game challenges), time period (e.g., every X minutes, hours, days, or similar time period), or any other similar measurement of frequency.

The progress level rule 1004 may be a rule that specifies that a game challenge will not involve a game object above the player's current experience level. That is, the progress level rule 1004 may specify that game challenges may involve unlocked game objects.

As shown in FIG. 10, in some example embodiments, the viral game challenge rule 1002 and the progress level rule 1004 are rules that specify a requirement. In such cases, some embodiments require that the generated game quests do not violate these rules.

The crafted game object rule 1006 may specify that if a game challenge cannot be created with a crafted game object, crafted game object rule 1006 should be broken first. A crafted game object may refer to a composite game object that includes one or more constituent game objects.

The previous quest rule 1008 may be a rule that specifies that game challenges between adjacent game quests do not involve that same game objects or similar game objects. A game object may be similar to another game object if the two game objects are related based on either a constituent or composite relationship.

The current quest rule 1010 may be a rule that specifies that game challenges within the same game quest do not act on similar game objects.

As FIG. 10 shows, the stack ranking rules 1000 may specify a ranking for the various rules. Accordingly, when the dynamic content generator 304 cannot generate a game quest according to these rules, the dynamic content generator 304 may break one of the rules, such as a breakable rule with the highest priority. For example, the dynamic content generator 304 may determine that there are no possible game objects that can be selected to satisfy the viral game challenge rule 1002, the progress level rule 1004, the crafted game object rule 1006, the previous quest rule 1008, and the current quest rule 1010. Accordingly, the dynamic content generator 304 may first break the crafted game object rule 1006 to determine if a game object can be selected. If not, the dynamic content generator 304 may also break the previous quest rule 1008 to determine if a game object can be selected. If not, the dynamic content generator 304 may also break the current quest rule 1010 to determine if a game object can be selected.

FIG. 10 is provided by way of example and not limitation. It is to be appreciated that other example embodiments may use stack ranking rules different from the stack ranking rule 1000 shown in FIG. 10.

Selecting a Difficulty for the Game Challenge

In some embodiments, game profile data may be used to select a difficulty associated with the game object selected for a game challenge. For example, as operation 408 of FIG. 4 indicates, the dynamic content generator 304 of FIG. 3 may select a difficulty associated with a game challenge based on the gaming profile data 322. In some cases, the difficulty associated with the game challenge is determined by the number of times a player must perform a game action (e.g., sell) with respect to the selected game object (e.g., Apples).

Figure 11:
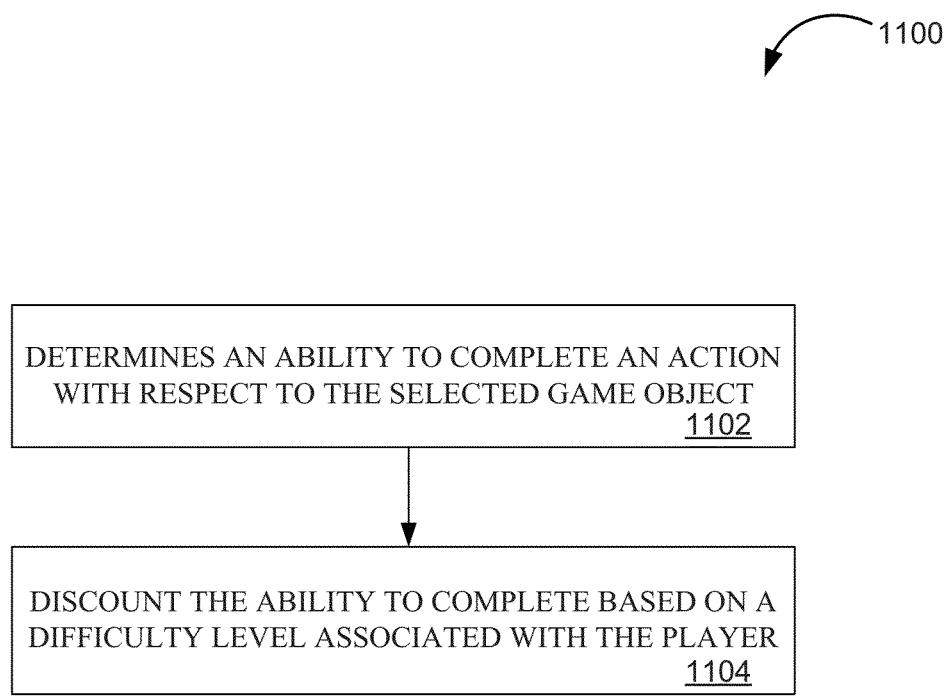
FIG. 11 is a flow chart diagram illustrating a method of selecting a difficulty associated with a game challenge, according to example embodiments.

FIG. 11 is a flow chart diagram illustrating a method 1100 of selecting a difficulty associated with a game challenge, according to example embodiments. At operation 1102, the dynamic content generator 304 determines an ability to complete an action with respect to the selected game object. The ability to complete may refer to a number of actions the player may perform with respect to a selected object given the game state of the player. For example, where the selected game object is a crop, the ability to complete may be based on a function of at least: a duration of the game challenge, an amount of resources needed to grow the crop (e.g., water, energy, fertilizer, and the like), the harvest time of the selected crop, a number of sessions a player is expected to play per time period, and a capacity of a resource (e.g., water, energy, fertilizer, and the like) that the player may collect (as may be determined based on the gaming profile 322). For example, where the player has a capacity to store 25 units of water, the player is expected to play 3 sessions a day, and the game quest is to last one day, the dynamic content generator 304 may determine that an ability to harvest 75 pumpkins if each pumpkin uses 1 unit of water to grow.

Where the selected game object is produced by a tree, the ability to complete may be based on at least a number of tree game objects on the player's game board. For example, where a tree produces Apples, the ability to complete may be based on a duration of the game challenge, a number of the tree game objects on the game board (but not less than 1), a harvest time of the tree, and a number of sessions a player is expected to play per time period.

Where the selected game object is produced by an animal game object (e.g., eggs from a chicken, milk from a cow, etc.), an ability to complete may be based on at least: a duration of the game challenge, a number of the animal game objects on the game board (but not less than 1), a harvest time of the animal, an amount of resources (e.g., feed) to generate the selected game object, a number of feeds the player can perform per session (e.g., based on: (feed required/water available)*number of animals), and a number of sessions a player is expected to play per time period.

Where the selected game object is a crafted game object (e.g., an apple pie), the ability to complete may be based on at least: a duration of the game challenge, an amount of crafting resource (e.g., crafting energy, virtual currency) used to complete a crafted game object, a capacity of the crafting resource that a player can collect, a harvest timer for the longest sub-object used to craft the crafted object, and a number of sessions a player is expected to play per time period.

Where the game challenge involves a viral activity (e.g., requesting action from one or more friends in the game network associated with the player), the ability to complete may be based on: a duration of the game challenge, a number of active friends, a response rate associated with the game network, a number of expected responses from the game network, and any other suitable social metric maintained in relation to the social graph 200. In some embodiments, the response rate may be based on a particular channel of communication, such as a response rate for email requests, response rates for content feed (news feed on FACEBOOK® or on a game platform such as ZYNGA®), messaging channel or mail box on a social platform, or the like. Accordingly, the ability to complete may be based on the response rate to the particular channel of communication associated with the game network.

In some embodiments, once the ability to complete is determined at operation 1102, the dynamic content generator 304 may then discount the ability to complete based on a difficulty level associated with the player. This is shown as operation 1104. For example, if the player is associated with an easy difficulty level, the maximum quantity is then discounted by A (5%); if the player is associated with an medium difficulty level, the maximum quantity is then discounted by B (25%); and if the player is associated with an hard difficulty level, the maximum quantity is then discounted by C (50%), where A>B>C. Further, it is to be appreciated that in some embodiments, the values of A, B, and C are tunable (at run- or design-time), or may be specific to the category of the game object (e.g., crop, versus tree, versus animal, versus crafted game object, etc.).

In some embodiments, the order of the difficulty of game challenges is based on whether a player has successfully completed game challenges in past game quests. In this way, game quests may get progressively more difficult as a player successfully completes the game challenges in a game quest. For example, where a player fails X consecutive game quests, the difficulty of the next game quest may be reduced by Y levels. In other embodiments, if a player fails two game quests in a row, the difficulty may be reset to an initial setting (e.g., 0). In yet another embodiment, if a player has been determined to be idle for X time period, the difficulty may reset to an initial setting.

In some cases, a difficulty system that increases as a player succeeds allows a player to succeed many times at easy orders. With each success the orders increase slightly in difficulty until players encounter orders they can't complete. Upon failure, the dynamic content generator 304 can reset the difficulty to an easier difficulty tier so the player can succeed again. Thus the order system attunes itself to each player's skill level procedurally. Table 1 shows an example of a difficulty system that increases as a player succeeds based on game quests that include three game challenges.

TABLE 1

| Streak # | Challenge 1 Difficulty | Challenge 2 Difficulty | Challenge 3 Difficulty |
|---|---|---|---|
| 1 | E | E | E |
| 2 | E | E | M |
| 3 | E | M | M |
| 4 | M | M | M |
| 5 | M | M | H |
| 6 | M | H | H |
| 7 | H | H | H |

In Table 1, E may represent an easy difficulty setting, M may represent a medium difficulty setting, and H may represent a hard difficulty setting. Accordingly, where a game platform generates game quests that each have multiple game challenges, the game platform may gradually increase the difficulty setting by selectively setting the difficulty level for particular game challenges.

Example Game Systems, Social Networks, and Social Graphs

As described above, the systems described herein may include, communicate, or otherwise interact with a game system. As such, the game system is now described to illustrate further embodiments. In an online multiuser game, users control player characters (PCs), a game engine controls non-player characters (NPCs), and the game engine also manages player character state and tracks states for currently active (e.g., online) users and currently inactive (e.g., offline) users.

A player character may have a set of attributes and a set of friends associated with the player character. As used herein, the terms "state" and "attribute" can be used interchangeably to refer to any game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state, and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a user (or a group of more than one users), the game engine may take into account the state of the player character (or group of player characters (PCs)) that is playing, but also the state of one or more PCs of offline/inactive users who are connected to the current user (or PC, or group of PCs) through the game social graph but are not necessarily involved in the game at the time.

For example, User A with six friends on User A's team (e.g., the friends that are listed as being in the user's mob/gang/set/army/business/crew/etc., depending on the nature of the game) may be playing the virtual game and choose to confront User B who has 20 friends on User B's team. In some embodiments, a user may only have first-degree friends on the user's team. In other embodiments, a user may also have second-degree and higher degree friends on the user's team. To resolve the game event, in some embodiments, the game engine may total up the weapon strength of the seven members of User A's team and the weapon strength of the 21 members of User B's team and decide an outcome of the confrontation based on a random variable applied to a probability distribution that favors the side with the greater total. In some embodiments, all of this may be done without any other current active participants other than User A (e.g., User A's friends. User, B, and User B's friends could all be offline or inactive). In some embodiments, the friends in a user's team may see a change in their state as part of the outcome of the game event. In some embodiments, the state (e.g., assets, condition, level) of friends beyond the first degree are taken into account.

Example Gaming Platforms

A virtual game may be hosted by the gaming platform 112, which can be accessed using any suitable connection with a suitable client device 104. A user may have a game account on the gaming platform 112, wherein the game account may contain a variety of information associated with the user (e.g., the user's personal information, financial information, purchase history, player character state, game state, etc.). In some embodiments, a user 102 may play multiple games on the gaming platform 112, which may maintain a single game account for the user with respect to the multiple games, or multiple individual game accounts for each game with respect to the user. In some embodiments, the gaming platform 112 may assign a unique identifier to a user 102 of a virtual game hosted on the gaming platform 112. The gaming platform 112 may determine that the user 102 is accessing the virtual game by reading the user's cookies, which may be appended to HTTP requests transmitted by the client device 104, and/or by the user 102 logging onto the virtual game.

In some embodiments, the user 102 accesses a virtual game and controls the game's progress via the client device 104 (e.g., by inputting commands to the game at the client device 104). The client device 104 can display the game interface, receive inputs from the user 102, transmit user inputs or other events to the game engine, and receive instructions from the game engine. The game engine can be executed on any suitable system (such as, for example, the client device 104, the social networking system 108, or the gaming platform 112). For example, the client device 104 may download client components of a virtual game, which are executed locally, while a remote game server, such as the gaming platform 112, provides backend support for the client components and may be responsible for maintaining application data of the game, processing the inputs from the user 102, updating and/or synchronizing the game state based on the game logic and each input from the user 102, and transmitting instructions to the client device 104. As another example, when the user 102 provides an input to the game through the client device 104 (such as, for example, by typing on the keyboard or clicking the mouse of the client device 104), the client components of the game may transmit the user's input to the gaming platform 112.

In some embodiments, the user 102 accesses particular game instances of a virtual game. A game instance is a copy of a specific game play area that is created during runtime. In some embodiments, a game instance is a discrete game play area where one or more users 102 can interact in synchronous or asynchronous play. A game instance may be, for example, a level, zone, area, region, location, virtual space, or other suitable play area. A game instance may be populated by one or more game objects. Each object may be defined within the game instance by one or more variables, such as, for example, position, height, width, depth, direction, time, duration, speed, color, and other suitable variables.

In some embodiments, a specific game instance may be associated with one or more specific users. A game instance is associated with a specific user when one or more game parameters of the game instance are associated with the specific user. For example, a game instance associated with a first user may be named "First User's Play Area." This game instance may be populated with the first user's PC and one or more game objects associated with the first user.

In some embodiments, a game instance associated with a specific user is only accessible by that specific user. For example, a first user may access a first game instance when playing a virtual game, and this first game instance may be inaccessible to all other users. In other embodiments, a game instance associated with a specific user is accessible by one or more other users, either synchronously or asynchronously with the specific user's game play. For example, a first user may be associated with a first game instance, but the first game instance may be accessed by all first-degree friends in the first user's social network.

In some embodiments, the set of game actions available to a specific user is different in a game instance that is associated with this user compared to a game instance that is not associated with this user. The set of game actions available to a specific user in a game instance associated with this user may be a subset, superset, or independent of the set of game actions available to this user in a game instance that is not associated with him. For example, a first user may be associated with Blackacre Farm in an online farming game, and may be able to plant crops on Blackacre Farm. If the first user accesses a game instance associated with another user, such as Whiteacre Farm, the game engine may not allow the first user to plant crops in that game instance. However, other game actions may be available to the first user, such as watering or fertilizing crops on Whiteacre Farm.

In some embodiments, a game engine interfaces with a social graph. Social graphs are models of connections between entities (e.g., individuals, users, contacts, friends, users, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a user or player character in an online multiuser game.

In some embodiments, the social graph is managed by the gaming platform 112, which is managed by the game operator. In other embodiments, the social graph is part of a social networking system 108 managed by a third party (e.g., Facebook, Friendster, Myspace). In yet other embodiments, the user 102 has a social network on both the gaming platform 112 and the social networking system 108, wherein the user 102 can have a social network on the gaming platform 112 that is a subset, superset, or independent of the user's social network on the social networking system 108. In such combined systems, gaming platform 112 can maintain social graph information with edge-type attributes that indicate whether a given friend is an "in-game friend," an "out-of-game friend," or both. The various embodiments disclosed herein are operable when the social graph is managed by the social networking system 108, the gaming platform 112, or both.

Example Systems and Methods

Returning to FIG. 2, the User Player may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to Player 201. As used herein, the terms "user" and "player" can be used interchangeably and can refer to any user in an online multiuser game system or social networking system. As used herein, the term "friend" can mean any node within a user's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In the social graph 200, it is possible for individuals to be connected to other individuals through their first-degree friends (e.g., friends of friends). As described above, the number of edges in a minimum path that connects a user to another user is considered the degree of separation. For example, FIG. 2 shows that Player 201 has three second-degree friends to which Player 201 is connected via Player 201's connection to Player 201's first-degree friends. Second-degree Friend $1_2$ 212 and Friend $2_2$ 222 are connected to Player 201 via Player 201's first-degree Friend $1_1$ 211. The limit on the depth of friend connections, or the number of degrees of separation for associations, that Player 201 is allowed is typically dictated by the restrictions and policies implemented by the social networking system 108.

In various embodiments, Player 201 can have Nth-degree friends connected to him through a chain of intermediary degree friends as indicated in FIG. 2. For example, Nth-degree Friend $1_N$ 219 is connected to Player 201 within in-game social network 260 via second-degree Friend $3_2$ 232 and one or more other higher-degree friends.

In some embodiments, a user (or player character) has a social graph within an online multiuser game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in Player 201's out-of-game social network 250. Player 201 also has in-game connections 265 to a plurality of users, forming in-game social network 260. Here, Friend $2_1$ 221, Friend $3_1$ 231, and Friend $4_1$ 241 are first-degree friends with Player 201 in Player 201's in-game social network 260. In some embodiments, a game engine can access in-game social network 260, out-of-game social network 250, or both.

In some embodiments, the connections in a user's in-game social network is formed both explicitly (e.g., when users "friend" each other) and implicitly (e.g., when the system observes user behaviors and "friends" users to each other). Unless otherwise indicated, reference to a friend connection between two or more users can be interpreted to cover both explicit and implicit connections, using one or more social graphs and other factors to infer friend connections. The friend connections can be unidirectional or bidirectional. It is also not a limitation of this description that two users who are deemed "friends" for the purposes of this disclosure are not friends in real life (e.g., in disintermediated interactions or the like), but that can be the case.

Figure 12:
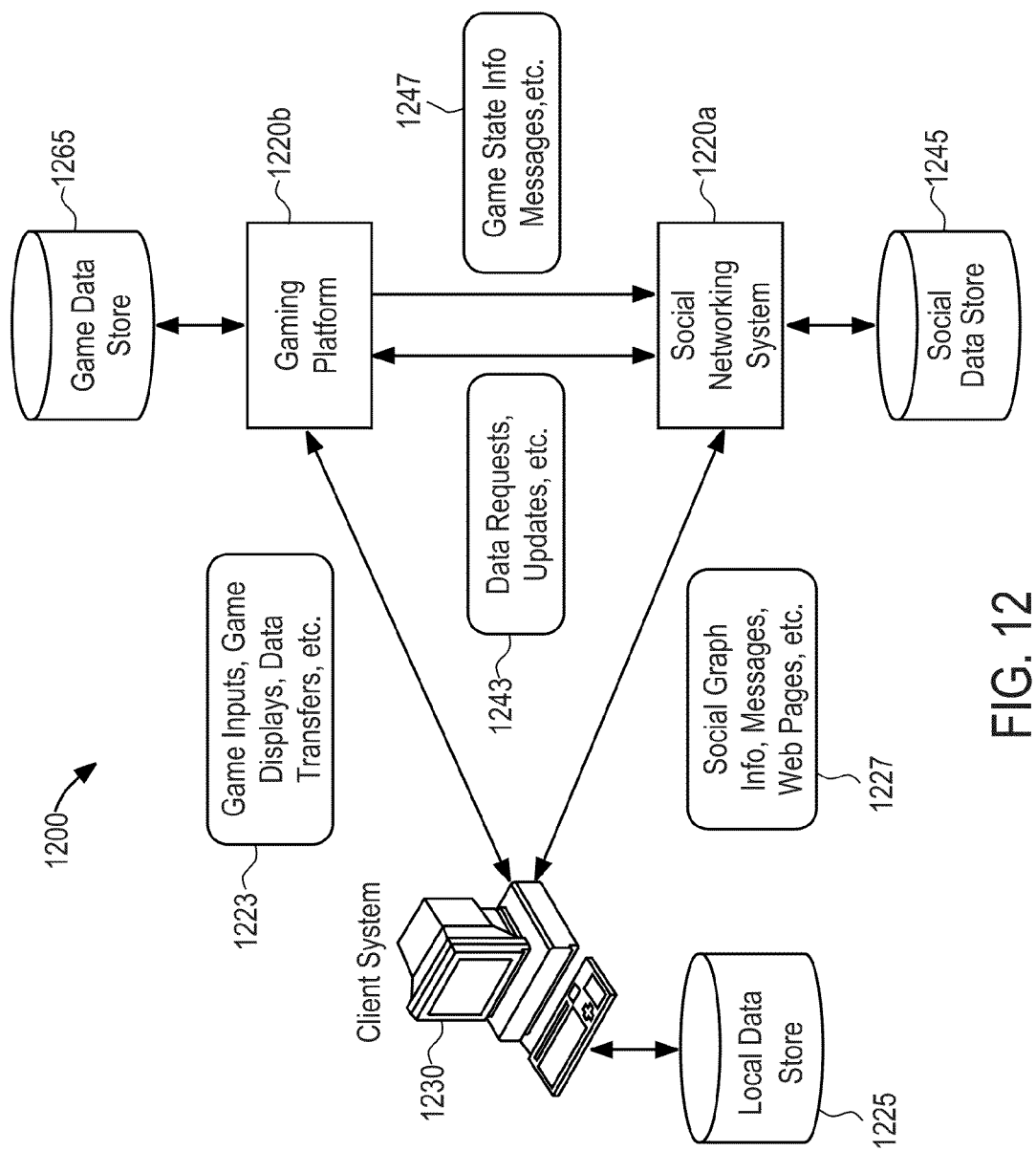
FIG. 12 illustrates an example data flow between example components of the example system of FIG. 1, according to some embodiments.

FIG. 12 illustrates an example data flow between example components of an example system 1200. One or more of the components of the example system 1200 may correspond to one or more of the components of the example gaming environment 100. In some embodiments, the system 1200 includes a client system 1230, a social networking system 1220a, and a gaming platform 1220b. The components of system 1200 can be connected to each other in any suitable configuration, using any suitable type of connection. The components may be connected directly or over any suitable network. The client system 1230, the social networking system 1220a, and the gaming platform 1220b may have one or more corresponding data stores such as local data store 1225, social data store 1245, and game data store 1265, respectively.

The client system 1230 may receive and transmit data 1223 to and from the gaming platform 1220b. This data can include, for example, a web page, a message, a game input, a game display, a HTTP packet, a data request, transaction information, and other suitable data. At some other time, or at the same time, the gaming platform 1220b may communicate data 1243, 1247 (e.g., game state information, game system account information, page info, messages, data requests, updates) with other networking systems, such as the social networking system 1220a (e.g., Facebook, Myspace). The client system 1230 can also receive and transmit data 1227 to and from the social networking system 1220a. This data can include, for example, web pages, messages, social graph information, social network displays, HTTP packets, data requests, transaction information, updates, and other suitable data.

Communication between the client system 1230, the social networking system 1220a, and the gaming platform 1220b can occur over any appropriate electronic communication medium or network using any suitable communications protocols. For example, the client system 1230, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a user accesses a virtual game on the gaming platform 1220b, the BLOB containing the game state for the instance corresponding to the user may be transmitted to the client system 1230 for use by a client-side executed object to process. In some embodiments, the client-side executable is a FLASH-based game, which can de-serialize the game state data in the BLOB. As a user plays the game, the game logic implemented at the client system 1230 maintains and modifies the various game state parameters locally. The client-side game logic may also batch game events, such as mouse clicks, and transmit these events to the gaming platform 1220b. Gaming platform 1220b may itself operate by retrieving a copy of the BLOB from a database or an intermediate memory cache (memcache) layer. The gaming platform 1220b can also de-serialize the BLOB to resolve the game state parameters and execute its own game logic based on the events in the batch file of events transmitted by the client to synchronize the game state on the server side. The gaming platform 1220b may then re-serialize the game state, now modified into a BLOB, and pass this to a memory cache layer for lazy updates to a persistent database.

In some embodiments, a computer-implemented game is a text-based or turn-based game implemented as a series of web pages that are generated after a user selects one or more actions to perform. The web pages may be displayed in a browser client executed on the client system 1230. For example, a client application downloaded to the client system 1230 may operate to serve a set of web pages to a user. As another example, a virtual game may be an animated or rendered game executable as a stand-alone application or within the context of a webpage or other structured document. In some embodiments, the virtual game is implemented using Adobe Flash-based technologies. As an example, a game may be fully or partially implemented as a SWF object that is embedded in a web page and executable by a Flash media user plug-in. In some embodiments, one or more described web pages are associated with or accessed by the social networking system 1220a. This disclosure contemplates using any suitable application for the retrieval and rendering of structured documents hosted by any suitable network-addressable resource or website.

Application event data of a game is any data relevant to the game (e.g., user inputs). In some embodiments, each application datum may have a name and a value, and the value of the application datum may change (e.g., be updated) at any time. When an update to an application datum occurs at the client system 1230, either caused by an action of a game user or by the game logic itself, the client system 1230 may need to inform the gaming platform 1220b of the update. For example, if the game is a farming game with a harvest mechanic (such as Zynga FarmVille), an event can correspond to a user clicking on a parcel of land to harvest a crop. In such an instance, the application event data may identify an event or action (e.g., harvest) and an object in the game to which the event or action applies.

In some embodiments, one or more objects of a game are represented as an Adobe Flash object. Flash may manipulate vector and raster graphics, and supports bidirectional streaming of audio and video. "Flash" may mean the authoring environment, the user, or the application files. In some embodiments, the client system 1230 may include a Flash client. The Flash client may be configured to receive and run the Flash application or game object code from any suitable networking system (such as, for example, the social networking system 1220a or the gaming platform 1220b). In some embodiments, the Flash client is run in a browser client executed on the client system 1230. A user can interact with Flash objects using the client system 1230 and the Flash client. The Flash objects can represent a variety of game objects. Thus, the user may perform various game actions on various game objects by making various changes and updates to the associated Flash objects.

In some embodiments, game actions are initiated by clicking or similarly interacting with a Flash object that represents a particular game object. For example, a user can interact with a Flash object to use, move, rotate, delete, attack, shoot, or harvest a game object. This disclosure contemplates performing any suitable game action by interacting with any suitable Flash object. In some embodiments, when the user makes a change to a Flash object representing a game object, the client-executed game logic may update one or more game state parameters associated with the game object. To ensure synchronization between the Flash object shown to the user at the client system 1230, the Flash client may send the events that caused the game state changes to the game object to the gaming platform 1220b. However, to expedite the processing and hence the speed of the overall gaming experience, the Flash client may collect a batch of some number of events or updates into a batch file. The number of events or updates may be determined by the Flash client dynamically or determined by the gaming platform 1220b based on server loads or other factors. For example, client system 1230 may send a batch file to the gaming platform 1220b whenever 50 updates have been collected or after a threshold period of time, such as every minute.

As used herein, the term "application event data" may refer to any data relevant to a computer-implemented virtual game application that may affect one or more game state parameters, including, for example and without limitation, changes to user data or metadata, changes to user social connections or contacts, user inputs to the game, and events generated by the game logic. In some embodiments, each application datum has a name and a value. The value of an application datum may change at any time in response to the game play of a user or in response to the game engine (e.g., based on the game logic). In some embodiments, an application data update occurs when the value of a specific application datum is changed.

In some embodiments, when a user plays a virtual game on the client system 1230, the gaming platform 1220b serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular user and a particular virtual game. In some embodiments, while a user is not playing the virtual game, the corresponding BLOB may be stored in the database. This enables a user to stop playing the game at any time without losing the current state of the game the user is in. When a user resumes playing the game next time, gaming platform 1220b may retrieve the corresponding BLOB from the database to determine the most-recent values of the game-related data. In some embodiments, while a user is playing the virtual game, the gaming platform 1220b also loads the corresponding BLOB into a memory cache so that the game system may have faster access to the BLOB and the game-related data contained therein.

Figure 13:
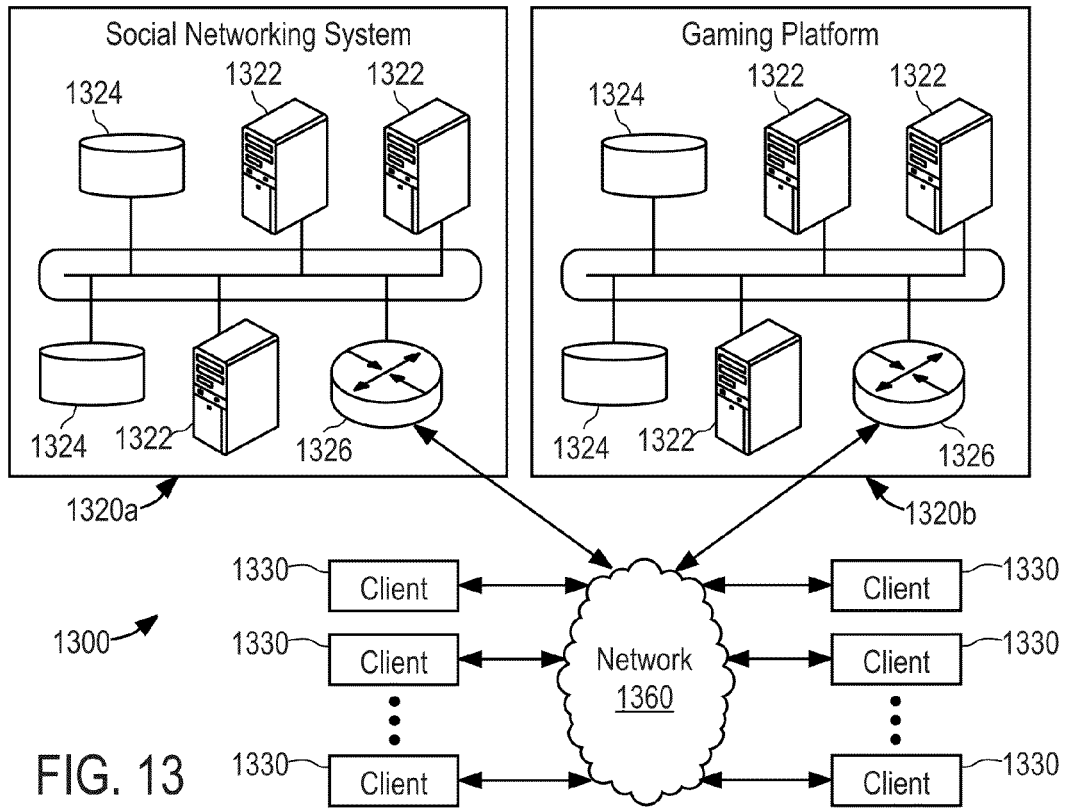
FIG. 13 illustrates an example network environment, in which various example embodiments may operate.

Various embodiments may operate in a wide area network environment, such as the Internet, including multiple network addressable systems. FIG. 13 illustrates an example network environment 1300, in which various example embodiments may operate. Network cloud 1360 generally represents one or more interconnected networks, over which the systems and hosts described herein can communicate. The network cloud 1360 may include packet-based WANs (such as the Internet), private networks, wireless networks, satellite networks, cellular networks, paging networks, and the like. As FIG. 13 illustrates, various embodiments may operate in a network environment 1300 comprising one or more networking systems, such as a social networking system 1320a, a gaming platform 1320b, and one or more client systems 1330. The components of the social networking system 1320a and the gaming platform 1320b operate analogously; as such, hereinafter they may be referred to simply as the networking system 1320. The client systems 1330 are operably connected to the network environment 1300 via a network service provider, a wireless carrier, or any other suitable means.

The networking system 1320 is a network addressable system that, in various example embodiments, comprises one or more physical servers 1322 and data stores 1324. The one or more physical servers 1322 are operably connected to the computer network cloud 1360 via, by way of example, a set of routers and/or networking switches 1326. In an example embodiment, the functionality hosted by the one or more physical servers 1322 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 1322 may host functionality directed to the operations of the networking system 1320. Hereinafter, the servers 1322 may be referred to as server 1322, although the server 1322 may include numerous servers hosting, for example, the networking system 1320, as well as other content distribution servers, data stores, and databases. The data store 1324 may store content and data relating to, and enabling operation of, the networking system 1320 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like.

Logically, the data store 1324 corresponds to one or more of a variety of separate and integrated databases, such as relational databases and object-oriented databases, that maintain information as an integrated collection of logically related records or files stored on one or more physical systems. Structurally, the data store 1324 may generally include one or more of a large class of data storage and management systems. In some embodiments, the data store 1324 may be implemented by any suitable physical system(s) including components, such as one or more database servers, mass storage media, media library systems, storage area networks, data storage clouds, and the like. In one example embodiment, the data store 1324 includes one or more servers, databases (e.g., MySQL), and/or data warehouses. Data store 1324 may include data associated with different networking system 1320 users and/or client systems 1330.

The client system 1330 is generally a computer or computing device including functionality for communicating (e.g., remotely) over a computer network. The client system 1330 may be a desktop computer, laptop computer, PDA, in- or out-of-car navigation system, smart phone or other cellular or mobile phone, or mobile gaming device, among other suitable computing devices. The client system 1330 may execute one or more client applications, such as a Web browser.

When a user at the client system 1330 desires to view a particular webpage (hereinafter also referred to as target structured document) hosted by the networking system 1320, the user's web browser, or other document rendering engine or suitable client application, formulates and transmits a request to the networking system 1320. The request generally includes a URL or other document identifier as well as metadata or other information. By way of example, the request may include information identifying the user, a timestamp identifying when the request was transmitted, and/or location information identifying a geographic location of the user's client system 1330 or a logical network location of the user's client system 1330.

Although the example network environment 1300 described above and illustrated in FIG. 13 is described with respect to the social networking system 1320*a* and the gaming platform 1320*b*, this disclosure encompasses any suitable network environment using any suitable systems. For example, a network environment may include online media systems, online reviewing systems, online search engines, online advertising systems, or any combination of two or more such systems.

Figure 14:
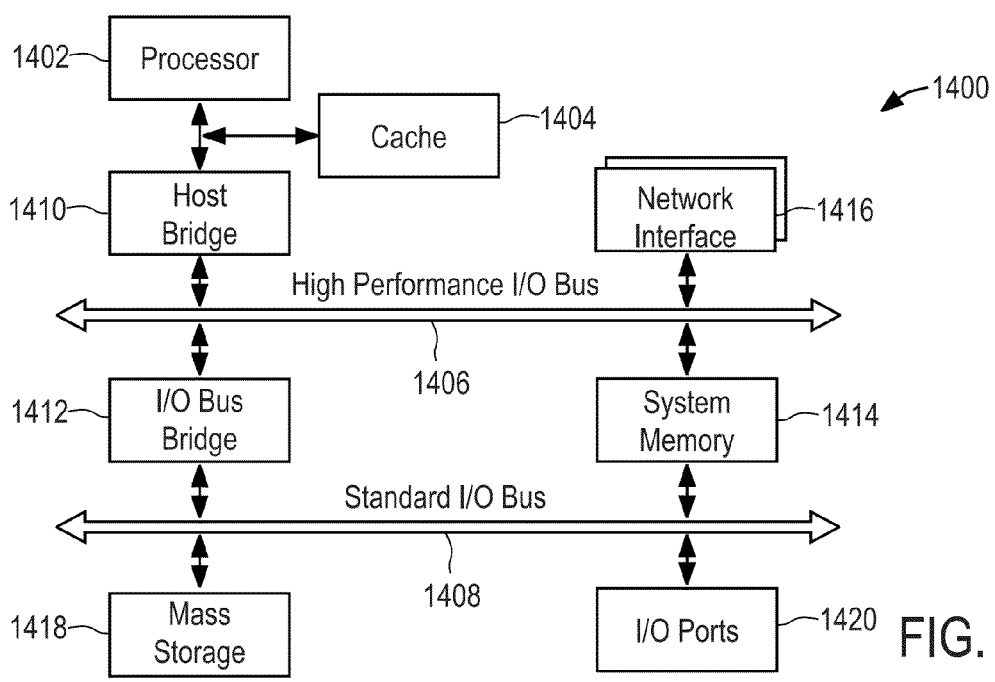
FIG. 14 illustrates an example computing system architecture, which may be used to implement one or more of the methodologies described herein, according to some embodiments.

FIG. 14 illustrates an example computing system architecture, which may be used to implement a server 1322 or a client system 1330. In one embodiment, the hardware system 1400 comprises a processor 1402, a cache memory 1404, and one or more executable modules and drivers, stored on a tangible computer-readable storage medium, directed to the functions described herein. Additionally, the hardware system 1400 may include a high performance input/output (I/O) bus 1406 and a standard I/O bus 1408. A host bridge 1410 may couple the processor 1402 to the high performance I/O bus 1406, whereas the I/O bus bridge 1412 couples the two buses 1406 and 1408 to each other. A system memory 1414 and one or more network/communication interfaces 1416 may couple to the bus 1406. The hardware system 1400 may further include video memory (not shown) and a display device coupled to the video memory. Mass storage 1418 and I/O ports 1420 may couple to the bus 1408. The hardware system 1400 may optionally include a keyboard, a pointing device, and a display device (not shown) coupled to the bus 1408. Collectively, these elements are intended to represent a broad category of computer hardware systems.

The elements of the hardware system 1400 are described in greater detail below. In particular, the network interface 1416 provides communication between the hardware system 1400 and any of a wide range of networks, such as an Ethernet (e.g., IEEE 802.3) network, a backplane, and the like. The mass storage 1418 provides permanent storage for the data and programming instructions to perform the above-described functions implemented in servers 1422 of FIG. 13, whereas system memory 1414 (e.g., DRAM) provides temporary storage for the data and programming instructions when executed by the processor 1402. I/O ports 1420 are one or more serial and/or parallel communication ports that provide communication between additional peripheral devices, which may be coupled to the hardware system 1400.

The hardware system 1400 may include a variety of system architectures, and various components of the hardware system 1400 may be rearranged. For example, cache memory 1404 may be on-chip with the processor 1402. Alternatively, the cache memory 1404 and the processor 1402 may be packed together as a "processor module," with processor 1402 being referred to as the "processor core." Furthermore, certain embodiments of the present disclosure may neither require nor include all of the above components. For example, the peripheral devices shown coupled to the standard I/O bus 1408 may couple to the high performance I/O bus 1406. In addition, in some embodiments, only a single bus may exist, with the components of the hardware system 1400 being coupled to the single bus. Furthermore, the hardware system 1400 may include additional components, such as additional processors, storage devices, or memories.

An operating system manages and controls the operation of the hardware system 1400, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting," and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments, the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with game challenges (as may be provided through a quest mechanic), the embodiments can be applied to communication targeted to a user, such as an advertisement, notification, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method, comprising:
   identifying a first game object and a second game object operable within a game challenge of an online game;
   calculating, based on game profile data associated with a player, a first selection factor associated with the first game object and a second selection factor associated with the second game object;
   selecting, based on the first selection factor and the second selection factor, a game object from the first game object and the second game object;
   generating, using a processor, the game challenge based on the selected game object, the game challenge defined as being completable based on the player crafting at least one instance of the selected game object as a composite object comprising an instance of a combination of a plurality constituent game objects available to at least one player of the online game; and
   generating display data based on the game challenge for display with a user interface of a game.

2. The computer-implemented method of claim 1, wherein the game profile data includes at least one of: data relating to game objects in a game board assigned to the player, game objects in an inventory of the player, a response rate of the game network associated with the player, and past game challenges completed by the player.

3. The computer-implemented method of claim 1, wherein identifying the first game object and the second game object includes accessing a target manifest, the target manifest including data that identifies two or more game objects operable in a game.

4. The computer-implemented method of claim 1, wherein calculating the first selection factor associated with the first game object includes increasing the first selection factor based on the game profile data indicating that the player has a constituent game object related to the first game object in inventory.

5. The computer-implemented method of claim 1, wherein calculating the first selection factor associated with the first game object includes increasing the first selection factor based on the game profile data indicating that the player has a constituent game object related to the first game object in a game board belonging to the player.

6. The computer-implemented method of claim 1, wherein calculating the second selection factor associated with the second game object includes decreasing the second selection factor based on the game profile data indicating that the player completed a prior game challenge involving a constituent game object related to the second game object.

7. The computer-implemented method of claim 1, wherein calculating the second selection factor associated with the second game object includes decreasing the second selection factor based on an experience level stored in the game profile data indicating that the second game object is locked.

8. The computer-implemented method of claim 1, further comprising, using the game profile data, determining a difficulty associated with the game challenge.

9. The computer-implemented method of claim 8, wherein determining the difficulty associated with the game challenge includes determining an ability to complete with respect to the selected game object, the ability to complete being a number based on a function of a number of sessions per a determinable time period, a resource associated with the selected game object, and a capacity the player has to store the resource.

10. The computer-implemented method of claim 8, wherein determining the difficulty associated with the game challenge includes determining an ability to complete, the ability to complete being a number based on a response rate of a game network associated with the player.

11. A computer system comprising:
    at least one processor;
    a dynamic content generator implemented by the at least one processor and configured to:
      identify a first game object and a second game object operable within a game challenge of an online game;
      calculate, based on game profile data associated with a player, a first selection factor associated with the first game object and a second selection factor associated with the second game object; and
      select, based on the first selection factor and the second selection factor, a game object from the first game object and the second game object;
    a game engine module implemented by the at least one processor and configured to generate the game challenge based on the selected game object, the game challenge defined as being completable based on the player crafting at least one instance of the selected game object as a composite object comprising an instance of a combination of a plurality constituent game objects available to at least one player of the online game; and a display module implemented by the at least one processor and configured to generate display data based on the game challenge for display with a user interface of a game.

12. The computer system of claim 11, wherein the game profile data includes at least one of: data relating to game objects in a game board assigned to the player, game objects in an inventory of the player, a response rate of the game network associated with the player, and past game challenges completed by the player.

13. The computer system of claim 11, wherein the dynamic content generator is configured to identify the first game object and the second game object by accessing a target manifest, the target manifest including data that identifies two or more game objects operable in a game.

14. The computer system of claim 11, wherein the dynamic content generator is configured to identify the first game object and the second game object by increasing the first selection factor based on the game profile data indicating that the player has a game object related to the first game object in inventory.

15. The computer system of claim 11, wherein the dynamic content generator is configured to calculate the first selection factor associated with the first game object by increasing the first selection factor based on the game profile data indicating that the player has a constituent game object related to the first game object in a game board belonging to the player.

16. The computer system of claim 11, wherein the dynamic content generator is configured to calculate the second selection factor associated with the second game object by decreasing the second selection factor based on the game profile data indicating that the player completed a prior game challenge involving a constituent related to the second game object.

17. The computer system of claim 11, wherein the dynamic content generator is configured to calculate the second selection factor associated with the second game object by decreasing the second selection factor based on an experience level stored in the game profile data indicating that the second game object is locked.

18. The computer system of claim 11, wherein the dynamic content generator is further configured to determine, using the game profile data, a difficulty associated with the game challenge.

19. The computer system of claim 18, wherein the dynamic content generator is further configured to determine the difficulty associated with the game challenge includes determining an ability to complete, the ability to complete being a number based on a response rate of a game network associated with the player.

20. A non-transitory computer-readable storage medium storing instructions for causing a processor to implement operations, the operations comprising:
- identifying a first game object and a second game object operable within a game challenge in an online game;
- calculating, based on game profile data associated with a player, a first selection factor associated with the first game object and a second selection factor associated with the second game object;
- selecting, based on the first selection factor and the second selection factor, a game object from the first game object and the second game object;
- generating the game challenge based on the selected game object, the game challenge defined as being completable based on the player crafting at least one instance of the selected game object as a composite object comprising an instance of a combination of a plurality constituent game objects available to at least one player of the online game; and
- generating display data based on the game challenge for display with a user interface of a game.

* * * * *